Figure 1:
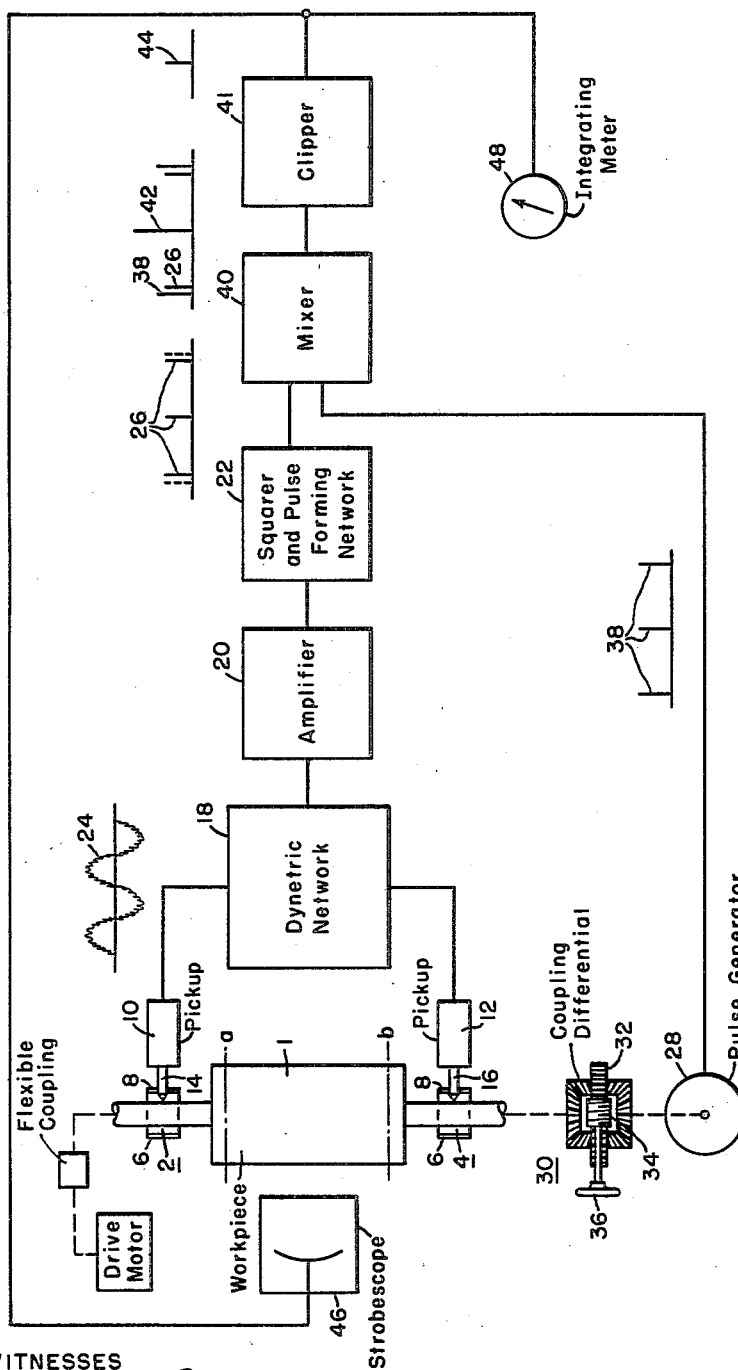

Aug. 26, 1958 S. I. RAMBO 2,848,897
STROBOSCOPIC BALANCE TESTER
Filed June 23, 1955 2 Sheets-Sheet 1

WITNESSES
Robert C. Baird
E. F. Oberhein

INVENTOR
Sheldon I. Rambo.
BY
Paul E. Friedemann
ATTORNEY

United States Patent Office 2,848,897
Patented Aug. 26, 1958

2,848,897
STROBOSCOPIC BALANCE TESTER

Sheldon I. Rambo, Baltimore, Md., assignor to Westinghouse Electric Corporation, East Pittsburgh, Pa., a corporation of Pennsylvania Application June 23, 1955, Serial No. 517,555

7 Claims. (Cl. 73—466)

This invention relates, generally, to vibration sensitive apparatus and, more particularly, to apparatus for determining the angle of unbalance of rotatable bodies.

In certain types of balancing machines, for example, of the type illustrated in United States Patent 2,165,024 to J. G. Baker et al., assigned to the assignee of the present invention, stroboscopic tubes are employed for illuminating, the rotating workpiece which is being balanced, in synchronizism with the rotation cycle of the workpiece. When so employed, the stroboscopic tube is controlled by voltage pulses applied to its grid. These voltage pulses are derived from the output of an electrical pick-up which is mounted with respect to the balancing machine to respond to vibratory movement of the rotating workpiece. As a result of the physical arrangement of the electrical pick-up with respect to the balancing machine, and of the circuits which are associated therewith and responsive to the electrical output of the electrical pick-up, the electrical voltage pulses which are applied to the grid of the stroboscopic tube, in the ideal case, are in synchronism with the rotational speed, and in the ideal situation cause the tube to be fired in repetitive time phase relation with vibratory movement of the workpiece, so that a particular spot on the workpiece is illuminated once each revolution to indicate the actual angular position of unbalance in the workpicee.

However, as will be described more particularly hereinafter, difficulties arise in connection with the production of the stroboscopic tube grid controlling pulses, due primarily to physical conditions involving the balancing machine apparatus, which results in random production of voltage pulses effective to trigger the tube and cause it to flash. These voltage pulses, being irregularly spaced in time, cause workpiece illumination at random circumferential points making the determination of the precise angle of unbalance in the workpiece difficult, and if the condition is serious enough, may even render the balancing machine useless in determining the angle of unbalance by this means.

One practical solution of the problem of random workpiece illumination is described in a copending application of the applicant herein, Serial No. 494,011, filed March 14, 1955, entitled "Electronic Tube Control Circuit," and assigned to the present assignee which describes an arrangement for delaying the application of minimum conducting anode voltage to the stroboscopic tube until about two-thirds of the vibration cycle has elapsed. By this method, extraneous or random voltage pulses appearing in the first two-thirds of the vibration cycle do not fire the tube because of the lack of sufficient anode voltage to cause or to support breakdown. This control is accomplished by means of a novel capacitor charging arrangement for producing the stroboscopic tube anode voltage, which flattened the charging characteristic to delay the build-up of minimum anode voltage required for tube conduction. By this expedient, circumferential scattering of illumination is minimized or eliminated so that the operator has little difficulty in visually averaging such narrow band of stray spot illumination as might exist under the worst conditions to determine the correct angle of unbalance.

Although the aforesaid method offers a satisfactory and economical solution to the problem of random illumination of the workpiece, there are other ways in which this condition may be controlled, and this invention is directed to another solution to the problem which is based upon an entirely different principle.

Accordingly, one object of this invention is to provide a balancing machine arrangement for determining the angle of unbalance in a rotating workpiece, which is simple with respect to operational requirements and positive in operation.

Another object of this invention is to provide a stroboscopic type of balancing machine apparatus in which random firing of the stroboscopic tube is minimized or eliminated.

Figure 2:
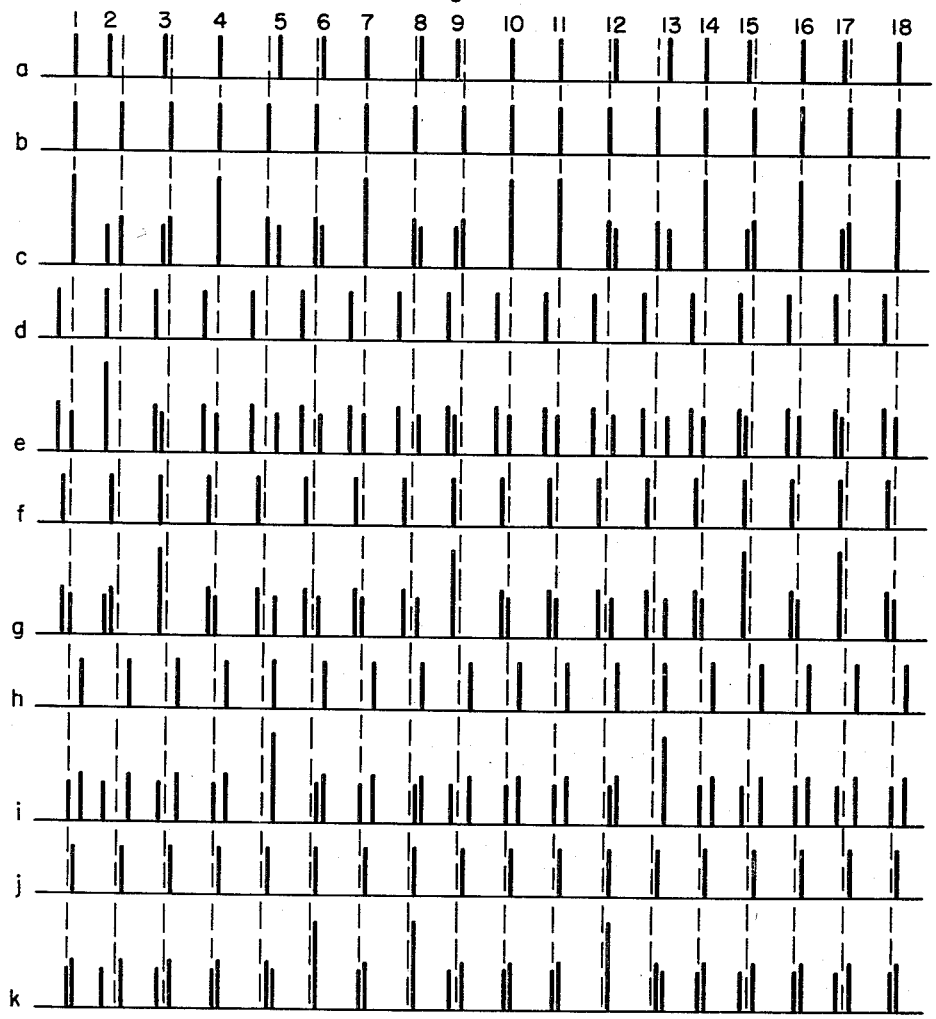
Figure 3:
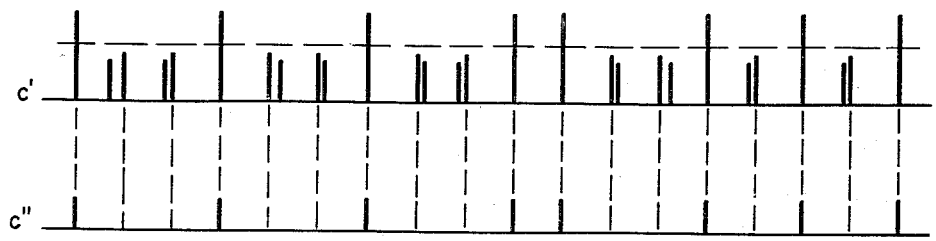

The foregoing statements are merely illustrative of the various aims and objects of this invention. Other objects and advantages will become apparent from a study of the following specification when considered in conjunction with the accompanying drawings, in which:

Figure 1 is a diagrammatic illustration of a balancing machine system embodying the principles of this invention;

Figure 2 graphically illustrates certain time phase characteristics of the voltage pulses employed herein for controlling firing of the stroboscopic tube; and Fig. 3 graphically illustrates the more desirable of the time phase characteristics represented in Fig. 2, together with the character of the voltage pulse derived by the present circuit means utilized to control the stroboscopic tube.

Referring to the drawings and particularly to Fig. 1, the workpiece 1 which is to be balanced is journaled in respective bearings 2 and 4. In one practical embodiment, these bearings are mounted at the upper end of respective flat-leaf springs 6 and 8. A top view of the arrangement is herein illustrated so only the upper edges of the flat-leaf springs are illustrated. These springs are arranged in parallel relationship and their bases are secured in suitable supports (not shown) on the bed of the balancing machine. Details of this resilient bearing support are not illustrated in the interest of simplicity, since per se such supports form no part of the present invention. However, reference may be had to the aforesaid patent to J. G. Baker et al. for details of such bearing supports.

The balancing machine system herein described is generally known as a two plane balancing arrangement, in which the bearings each provide a single degree of freedom for the opposite ends of the rotor. In this particular instance, the single degree of freedom is in a horizontal plane, and the correction planes which are disposed transversely of the axis of rotation of the body are indicated by the dot-dash lines designated (a) and (b), which are disposed in axially displaced positions along the rotor. These planes define the axial position on the rotor in which weight is to be added or removed, as the conditions may require, in order to balance the rotor.

Vibratory movement of the respective ends of the rotor or workpiece 1 which is to be balanced is detected by respective electrical pick-up devices 10 and 12 provided with prods 14 and 16 which engage the respective bearings. Any suitable type of electrical pick-up device may be employed. One type known as the electrodynamic type of pick-up having a moving coil driven across a magnetic field by the vibratory movement of the associated bearing, and producing a voltage proportional to the velocity of the movement, is illustrated in the aforesaid patent to J. G. Baker et al. Other suitable types of electrical pick-ups include the crystal type, the magnetostrictive type, the resistance type, the capacitive type and the photoelectric type, all of which are well known in the art and require no further consideration in this application.

The output of each electrical pick-up is applied to a plane separation network generally designated 18, in which the pick-up voltages are suitably mixed. The purpose of mixing these voltages is to obtain an indication of vibratory movement at one end of the rotor, which is compensated for the effect of the unbalance disturbance in the other correction plane. In other words, and by way of example, mixing of the signals limits the output voltage of the plane separation network with respect to pick-up 10 due only to the effect of mass unbalance with respect to the associated correction plane (*a*), and eliminates the effect of unbalance with respect to correction plane (*b*) in the output voltage of the plane separation network. The function of the plane separation network in achieving such a result is also completely described in detail in the aforesaid patent to J. G. Baker et al.

For an electrodynamic type of pick-up in the ideal case, the output of the plane separation network is a sinusoidal voltage of a frequency corresponding to running frequency of the workpiece. This voltage is amplified by means of an amplifier 20 and applied to a squaring and pulse-forming network 22, which may comprise a conventional clipper limiter input stage, which squares the incoming sinusoidal voltage, and a derivative type output circuit, to the input of which the square wave output voltage of the squarer stage is applied. The output voltage of this squaring and pulse-forming circuit 22, in the ideal case, is therefore a series of voltage pulses synchronized with the running frequency of the rotating workpiece; that is, ideally these voltage pulses are regularly spaced in time.

According to prior practice, the output voltage of circuit 22 is usually applied to the grid of a stroboscopic tube, for example, such as a 1D21 which is physically arranged to illuminate the workpiece, once each time it flashes. These tubes conventionally comprise an anode, a cathode and a screen grid, as well as a control grid. Ordinarily, plate voltage is provided by means of a capacitor, the charging rate of which is timed to correspond to the frequency of rotation of the workpiece, so that anode voltage is applied to the stroboscopic tube once during each revolution of the workpiece. The squaring and pulse-forming network output is usually connected to the control grid of the stroboscopic tube by means of a capacitor according to conventional practice.

Again, referring to the ideal case, in which case the output of the pickup 10 is theoretically a pure sinusoidal voltage, conventional squaring and pulse-forming networks are capable of producing voltage pulses which are regularly spaced in time. Consequently, the time phase relation of these voltage pulses to the angle of mass unbalance in the rotor or workpiece is correct, and the workpiece is illuminated once each revolution at the precise circumferential point from which the correct angle of unbalance may be determined. As a practical matter, however, various conditions in the balancing machine, including bearing roughness, floor vibration and etc. result in modulation of the pick-up output voltage substantially as illustrated at 24 adjacent the pick-up 10, which represents a typical output voltage of the pick-up. This high-frequency component appearing in the pick-up output voltage may have momentary peaks exceeding the maximum value of the pure sine wave and may result in the production of voltage pulses in the output of the squarer and pulse-forming networks approximately as indicated at 26 adjacent the circuit 22. These voltage pulses are shown related to the positions of the properly spaced pulses which positions are indicated by the broken lines. The first of the three pulses shown lags the properly spaced pulse, the second is in proper time phase relation and the third leads the properly disposed pulse. From this it will be seen that the direct application of these irregularly spaced pulses to the stroboscopic tube will result in random firing of the tube causing illumination of various or random points on the workpiece making the determination of the precise angle of unbalance very difficult if not impossible.

The present invention prevents the application of such random pulses to the stroboscipic tube by utilizing a reference voltage pulse which is synchronously produced with rotation of the workpiece; that is, one pulse is produced with each complete revolution of the workpiece and the arrangement is such that these pulses are regularly or equally spaced in time. Means are provided in effect for utilizing these pulses to gate a suitable circuit requiring time coincidence between the voltage pulses of the electrical pick-up with the reference voltage pulses to produce an electrical voltage pulse output. With this arrangement, only those pulses are applied to fire the stroboscopic tube which are properly related to the reference voltage pulse, and since these reference voltage pulses are regularly spaced in time, the tube is fired at regular intervals, and, as will be seen hereinafter, at the proper instant with respect to the angular position of the rotor.

Specifically, this arrangement comprises a voltage pulse generator 28 which is connected by means of a mechanical differential 30 to the rotating workpiece or alternatively to the drive motor which drives the rotating workpiece. This mechanical differential is provided with a rotatable cage element 32 which is driven by suitable gearing means such as the worm wheel and worm generally designated 34. To adjust the phase position of the voltage pulse generated by the pulse generator, the worm may be operated by a hand wheel 36 or a crank or other suitable means.

The pulse generator may take any form of well known pulse generators. The pulse generator 28 here used is, in a general sense, of the automobile distributor type. A narrow conducting wiper, driven in synchronism with the rotor being balanced, at a selected point during each revolution of the rotor momentarily bridges, or connects, a pair of closely spaced contacts in a circuit including a source of direct-current voltage, a resistor, and the closely spaced contacts. During each moment of contact bridging a sharp voltage pulse appears across the resistor. This voltage pulse is transmitted to the mixer 40.

In the arrangement shown, the voltage pulses 38 produced by the pulse generator 28 are combined with the voltage pulses 26 from the electrical pick-up by means of a mixer circuit 40, which adds the respective voltage pulses which are in time coincidence to produce a voltage pulse such as 42 having a magnitude greater than any of the incoming voltage pulses 26 or 38. The output of the mixer circuit is represented by the pulses 42, 26 and 38 as shown adjacent the mixer. This output is applied to a conventional clipper circuit 41 which removes all pulses except the composite voltage pulses 42 made up from the coincidence of voltage pulses 26 and 38 by amplitude discrimination and produces an output voltage pulse 44 in response thereto. With this arrangement, therefore, the output of the clipper circuit is represented only in voltage pulses 44 which are the result of respective voltage pulses 26 and 38 which are in time coincidence.

The mixer 40 may be any suitable well-known mixer for mixing voltage pulses. The mixer here being used is to the type disclosed in the National Bureau of Standards Report 3492, Preferred Circuits Manual. Either NBS Preferred Circuit No. 23 or NBS Preferred Circuit No. 24 will serve very well for mixing the pulses which rarely are over a few microseconds long and might occur with a pulse repetition frequency in the range from 5 to 300 cycles per second.

Voltage pulses 44 are applied to control the grid of a stroboscopic tube 46 such as the type 1D21, the details of which are not shown in the interest of simplicity. The output of the clipper circuit 41 is also applied to a suitable integrating means such as an integrating meter diagramatically shown at 48. Integrating meter 48 may be a standard voltmeter responsive to the voltage of a capacitor which is energized by the voltage pulses 44. The time constant of this capacitor is selected so that its charge will vary with the rate at which the voltage pulses 44 are applied thereto; that is, the capacitor charge will depend upon the frequency of voltage pulses 44. Such arrangements are conventional and need not be considered in detail at this time. With this arrangement, the integrating meter will indicate that condition in which maximum time coincidence among the respective pulses 26 and 38 is achieved, this condition being obtained by adjustment of the hand wheel 36 to shift the phase of pulses 38 with respect to pulses 26.

Fig. 2 graphically illustrates the manner in which the pulses 26 and 38 are combined to produce sum pulses such as 42 from which pulses 44 are produced for firing the stroboscopic tube at the true unbalance point without apparent jitter. Pulse group (a) in Fig. 2 represents a typical chain of pulses from one of the pick-ups when the signal-to-noise ratio is low. This is a condition in which the magnitude of unbalance is relatively small and the extraneous vibration components frequently referred to as "noise" are relatively large. When the ratio of the signal-to-noise becomes small, it is exceedingly difficult to distinguish the unbalance signal from the noise. In Fig. 2, the vertical broken lines indicate the true unbalance phase angles. Note that the pulses are scattered at random about the true angle of unbalance but since these pulses include those due to unbalance more pulses must necessarily occur at or near the true angle than at any other given angle. Pulse group (b) in Fig. 2 is a train of generator voltage pulses of pulse generator 28 which have been phased by rotating the mechanical differential 30 so that the pulses are in phase with the electrical pick-up of pulses in group (a) represented by pulses 1, 4, 7, 10, 11, 14, 16 and 18, which, in turn, happen to occur at the true unbalance angle. Pulse group (c) shows the sum of the pulse trains of pulse groups (a) and (b) which is typical of the output of the mixer 40. Pulse group (d) in Fig. 2 shows a train of generator pulses shifted ahead in time with respect to those of group (a) so as to be in phase with pulse 2. Pulse group (e) shows the sum of the pulse trains of groups (a) and (d). It should be noted here that time coincidence between the electric pick-up pulses and the pulse generator pulses occurs only once in the train indicated. Pulse group (f) illustrates a train of generator pulses shifted so as to be in phase with pulses 3, 9, 15 and 17 of pulse group (a). Pulse group (g) illustrates the sum of the pulse trains of groups (a) and (f). With this new position of the generator pulses with respect to the electric pick-up pulses, it will be seen that the frequency of time coincidence among the respective pulse trains is greater than was the case with the phase position of the generator pulse group represented in train (d). However, it will also be noted that time coincidence occurs in positions displaced in time from the true angle of unbalance represented by the vertical broken lines. Pulse group (h) illustrates a train of generator pulses shifted so as to be in phase with pulses 5 and 13. The mixer output for this relation of generator pulses to electric pick-up pulses is shown in pulse group (i). Here, time coincidence has occurred twice at widely spaced intervals and again in a position which is out of phase with the true angle of unbalance. Pulse group (j) shows a train of generator pulses shifted so as to be in phase with electric pick-up pulses 6, 8 and 12, and pulse train (k) shows the sum of the pulse trains of (a) and (j) as obtained in the output of the mixer circuit. Here again, time coincidence of the respective pulses occurs in angular positions displaced from the true angle of unbalance. This covers all possible phase relations of generator and pick-up pulses for the pulse array of group (a) which will allow addition of one or more pairs of pulses. It is obvious that phasing the pulse generator as represented in pulse train (b) results in the addition of the greatest number of pulses from the generator with those from the electrical pick-up, and that this phase relation corresponds to the true unbalance point.

From the considerations made in connection with Fig. 2, it will be observed that the only problem for achieving the more desirable condition displayed by pulse group (c) is to provide some means for indicating that phase position of the pulse generator in which maximum addition of the electrical pick-up and generator voltage pulses occurs. It is unnecessary to provide any means for attempting to determine that point at which the generator pulses occupy positions in time corresponding to the exact angular position of mass unbalance in the rotating workpiece, because as pointed out in connection with electrical pick-up pulse group (a), the majority of the electrical pick-up pulses occur in proper time phase with the exact angle of unbalance. Thus, a device such as the integrating meter 48 which indicates the maximum time of rate production of pulses 44 which for any given condition of unbalance are of constant magnitude is sufficient. This follows from the fact that the clipper circuit 41 cuts off all but the tips of the sum pulses.

In Fig. 3, pulse train (c) of Fig. 2 has been reproduced and designated (c'). Directly beneath pulse group (c') the characteristic output of the clipper circuit 41 is illustrated. This pulse group is designated (c''). Integrating meter 48 sums the pulses and indicates when the phase of the generator has been set to give the maximum number of sum pulses, and hence the true unbalance angle. Because of this clipping and summing technique, pulses can only appear at the stroboscopic lamp control grid at the proper time to illuminate the true unbalance point. Of course, as seen in pulse group (c''), there will not be one pulse for every revolution of the workpiece, for the case of low signal to noise ratio, but this does not interfere with correct operation except to reduce the average workpiece illumination slightly. In any case, random circumferential illumination of the workpiece is eliminated.

It will be appreciated by those skilled in the art that a skillful operator may dispense with the integrating meter 48 and rely upon visual observation to note that condition of maximum sum pulses appearing in the output of the clipper circuit 41. This can be done by observing the apparent intensity of illumination of the workpiece. Again, by reference to Fig. 2, it will be noted that there is a marked spread between the number of pulses appearing in pulse group (c), which has the higher number, with respect to the sum pulses appearing in pulse groups (e), (g), (i) and (k). Consequently, a skilled operator in most instances may be able to obtain an accurate indication from apparent light intensity at the workpiece of the condition of maximum time coincidence among the two pulse groups.

While a mixer and clipper circuit has been illustrated herein for producing the triggering pulses 44 for the stroboscopic tube 46, it will be appreciated that other conventional means may be employed at this point for achieving this result. For example, conventional "and" gates or "coincidence" circuits may be utilized to achieve this result. Such a gate may employ a simple two-grid vacuum tube which is periodically gated by the generator pulses 38 to place it in conducting condition, but yet requiring the application of electrical pick-up pulses, in time coincidence with the generator pulses, to the second control grid of the tube to cause tube condition. Thus, again, there will be no voltage pulses such as 44 produced unless pulses 26 and 38 are simultaneously applied to the respective control grids.

Also parallel connected double triodes or sharp cut-off pentodes having output circuits including conventional diode-clampers, in which the generator and pick-up voltage pulses 38 and 26 respectively, are applied to the respective grids of the parallel tubes, may be used to produce pulses such as 44 upon coincidence of pulses 38 and 26. These and other conventional expedients may be employed without departing from the spirit and scope of this invention.

From the foregoing disclosure and illustrations in the drawings, it will be appreciated that the present invention describes a new and novel balancing machine arrangement providing for the determination of the correct angle of unbalance in a rotating workpiece. The arrangement is such as to eliminate jitter in the indication of the angle of unbalance regardless of the noise which appears in the electrical pick-up signal and will always give a clear, steady indication of the true unbalance point.

Although but one embodiment of this invention has been specifically disclosed, it will be appreciated by those skilled in the art that numerous changes in the system, both as to its details and as to the organization of such details, may be made without departing from the spirit and scope thereof. Accordingly, it is intended that the foregoing disclosure and the showings made in the drawings shall be considered only as illustrative of the principles of this invention and not construed in a limiting sense.

I claim as my invention:

1. Apparatus for detecting the angle of unbalance of a rotatable body comprising, flexible bearing means for journaling a rotatable body, circuit means including electrical pick-up means responsive to vibratory movement of said body for producing electrical pulses which due to extraneous vibratory movement of said body and said bearing means are irregularly spaced in time, an electrical pulse generator driven in synchronism with said rotatable body and producing electrical pulses synchronized with said rotatable body, a mixer circuit receiving the electrical pulses from said electrical pick-up circuit means and said pulse generator and producing an electrical output which includes all said electrical pulses with coincident pulses added together to produce predominate pulses, a clipper circuit receiving the output of said mixer circuit and having an output of electrical pulses determined by said predominate pulses, an integrating device connected to the output of said clipper circuit for indicating the summation of said predominate pulses, means for shifting the phase of the electrical pulse output of said pulse generator to obtain maximum response from said integrating device, and a stroboscopic tube connected to the output of said clipper circuit to be controlled thereby and disposed to illuminate said rotatable body.

2. Apparatus for detecting the angle of unbalance of a rotatable body comprising, flexible bearing means for journaling a rotatable body, circuit means including electrical pick-up means responsive to vibratory movement of said body for producing electrical pulses which due to extraneous vibration of said body and bearing means are irregularly spaced in time, an electrical pulse generator driven in synchronism with said rotatable body and producing an electrical pulse once each revolution of said body, a mixer circuit receiving said respective electrical pulses and producing an electrical output including all said electrical pulses with respective coincident pulses added together, clipper circuit means receiving the output of said mixer circuit and having in its output substantially only the peaks of said coincident electrical pulses, integrating means responsive to said coincident electrical pulses of said last-named clipper circuit means for indicating the summation of said coincident electrical pulses, means for shifting the phase angle of said pulse generator to obtain maximum indication of said integrating means, and stroboscopic means controlled by said last-named clipper circuit means and disposed to illuminate said rotatable body.

3. Apparatus for detecting the angle of unbalance of a rotatable body comprising, flexible bearing means for journaling a rotatable body, circuit means including electrical pick-up means responsive to vibratory movement of said body for producing electrical pulses which due to extraneous vibration of said rotatable body and bearing means are irregularly spaced in time, an electrical pulse generator driven in synchronism with said rotatable body and producing electrical pulses synchronized with said rotatable body, circuit means controlled by said respective electrical pulses and producing an electrical pulse output in dependence of coincidence of said respective electrical pulses, and stroboscopic means controlled by said last-named electrical pulses and disposed to illuminate said rotatable body.

4. Apparatus for detecting the angle of unbalance of a rotatable body comprising, flexible bearing means for journaling a rotatable body, circuit means including electrical pick-up means responsive to vibratory movement of said body for producing electrical pulses which due to extraneous vibration of said rotatable body and bearing means are irregularly spaced in time, an electrical pulse generator driven in synchronism with said rotatable body and producing electrical pulses synchronized with said rotatable body, circuit means controlled by said respective electrical pulses and producing an electrical pulse output in dependence of coincidence of said respective electrical pulses, integrating means responsive to said electric pulse output for indicating the summation of said electrical pulse output in dependence of coincidence of said respective electrical pulses, phase shift means for shifting an element of said pulse generator to shift the phase of the pulses generated by said electrical pulse generator to obtain maximum coincidence of said respective pulses and hence maximum indication of said integrating means, and stroboscopic means controlled by said electric pulse output and disposed to illuminate said rotatable body.

5. Apparatus as set forth in claim 4 in which said phase shift means comprises a mechanical differential mechanically connected with said electrical pulse generator and provided with means for shifting the angular position of the rotor of the pulse generator with respect to the angular position of said rotatable body.

6. Apparatus for detecting the angle of unbalance of a rotatable body comprising, flexible bearing means for journaling a rotatable body, electrical means responsive to vibratory movement of said body for producing first voltage pulses which due to extraneous vibration of said rotatable body and bearing means are irregularly spaced in time, pulse generating means operated in dependence of rotational speed of said body for producing second voltage pulses synchronized with body rotation, circuit means responsive to said first and second voltage pulses and producing a control voltage pulse output when respective first and second voltage pulses are in time coincidence, integrating means controlled by said control voltage pulses for indicating the summation of said control voltage pulses, phase shift means for shifting an element of the pulse generating means to shift the phase of the pulses generated by said pulse generating means for shifting the phase of said second group of pulses to obtain maximum indication of said integrating means, and stroboscopic tube means controlled by said control voltage pulses and disposed to illuminate said body.

7. Apparatus for detecting the angle of unbalance of a rotatable body comprising, flexible bearing means for journaling a rotatable body, electrical means responsive to vibratory movement of said body for producing first voltage pulses which due to extraneous vibration of said rotatable body and bearing means are irregularly spaced in time, pulse generating means operated in dependence of rotational speed of said body for producing second voltage pulses synchronized with body rotation, circuit means responsive to said first and second voltage pulses and producing a control voltage pulse output when respective first and second voltage pulses are in time coincidence, stroboscopic tube means controlled by said control pulses to flash with each control pulse, and phase shift means for shifting an element of the pulse generating means to change the phase of the pulses generated by said pulse generating means to obtain maximum time coincidence between the first and second pulses and thereby obtain the maximum flash rate of said stroboscopic tube.

References Cited in the file of this patent

UNITED STATES PATENTS 2,174,176  Journeaux et al. _____ Sept. 26, 1939

FOREIGN PATENTS 726,107  Great Britain _____ Mar. 16, 1955